United States Patent
Nakae et al.

(10) Patent No.: US 8,555,637 B2
(45) Date of Patent: Oct. 15, 2013

(54) WORK VEHICLE

(75) Inventors: Yoshihide Nakae, Komatsu (JP); Kazushi Nakata, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/809,152

(22) PCT Filed: Jan. 19, 2012

(86) PCT No.: PCT/JP2012/051048
§ 371 (c)(1), (2), (4) Date: Jan. 8, 2013

(87) PCT Pub. No.: WO2012/099191
PCT Pub. Date: Jul. 26, 2012

(65) Prior Publication Data
US 2013/0112298 A1    May 9, 2013

(30) Foreign Application Priority Data
Jan. 21, 2011    (JP) .................................. 2011-011440

(51) Int. Cl.
*F02M 35/10*    (2006.01)
*F02B 37/00*    (2006.01)

(52) U.S. Cl.
USPC .......................... 60/605.1; 123/559.1; 138/39

(58) Field of Classification Search
USPC ..................... 60/605.1; 123/559.1; 138/37, 39
See application file for complete search history.

(56) References Cited

U.S. PATENT DOCUMENTS

| | | | | |
|---|---|---|---|---|
| 3,964,451 A | * | 6/1976 | Goto | 123/432 |
| 6,021,764 A | * | 2/2000 | Koyama | 123/563 |
| 6,182,707 B1 | * | 2/2001 | Shiraki et al. | 138/177 |
| 7,089,963 B2 | * | 8/2006 | Meheen | 138/39 |
| 7,093,589 B2 | * | 8/2006 | Sorersen et al. | 123/559.1 |
| 7,556,009 B2 | * | 7/2009 | Niakan et al. | 123/184.21 |
| 2010/0025136 A1 | * | 2/2010 | Matsushita et al. | 180/68.3 |
| 2011/0088637 A1 | * | 4/2011 | Hirasawa et al. | 123/41.31 |
| 2012/0247861 A1 | * | 10/2012 | Mizuno et al. | 180/296 |

FOREIGN PATENT DOCUMENTS

| | | |
|---|---|---|
| DE | 102010019931 A1 * | 11/2011 |
| JP | 59-60382 U | 4/1984 |
| JP | 61-198562 U | 12/1986 |
| JP | 3-68528 U | 7/1991 |
| JP | 4-21726 U | 2/1992 |
| JP | 8-90097 A | 4/1996 |
| JP | 8-510809 A | 11/1996 |
| JP | 2000205065 A * | 7/2000 |
| JP | 2003-254490 A | 9/2003 |
| JP | 2005-113912 A | 4/2005 |
| JP | 2006-240431 A | 9/2006 |
| JP | 2009-299589 A | 12/2009 |

* cited by examiner

*Primary Examiner* — John Rivell
(74) *Attorney, Agent, or Firm* — Global IP Counselors, LLP

(57) ABSTRACT

An air supply pipe includes a curved pipe portion having a first end and a second end, a first straight pipe portion extended along a first direction and a second straight pipe portion extended along a second direction. The cross-sectional shape of the curved pipe portion is a rectangular shape having longer sides in a third direction.

5 Claims, 5 Drawing Sheets

WORK VEHICLE

CROSS-REFERENCE TO RELATED APPLICATIONS

This application claims priority to Japanese Patent Application No. 2011-011440 filed on Jan. 21, 2011, the disclosure of which is hereby incorporated herein by reference in its entirety.

TECHNICAL FIELD

The present invention relates to an air supply pipe and a forced induction compressor including an air supply pipe.

BACKGROUND ART

A method of bending an air supply pipe has been widely used so far for preventing the air supply pipe from interfering with peripheral members thereof when the air supply pipe is installed in a small space such as an engine compartment.

In Japan Laid-open Patent Application Publication No. JP-A-2006-240431, for instance, an air supply pipe communicated with an air cleaner and a forced induction compressor is bent in a position closer to the forced induction compressor within an engine compartment of a construction machine. Accordingly, the air supply pipe is inhibited from interfering with peripheral members thereof.

SUMMARY

However, the air supply pipe described in Japan Laid-open Patent Application Publication No. JP-A-2006-240431 is uniformly formed in a cylindrical shape, and therefore, a bent portion of the air supply pipe is protruded towards peripheral members thereof Therefore, there is a limit to compactly produce the piping space for the air supply pipe.

The present invention has been produced in view of the aforementioned situation, and it is an object of the present invention to provide an air supply pipe whereby a piping space can be compactly produced and a forced induction compressor including the air supply pipe.

An air supply pipe comprising: a curved pipe portion formed in a tubular shape, the curved pipe portion including a first end, a second end and a rectangular pipe portion communicated with the first end and the second end; a first straight pipe portion formed in a cylindrical shape, the first straight pipe portion having a first outer diameter, the first straight pipe portion extended from the first end along a first direction; and a second straight pipe portion formed in a cylindrical shape, the second straight pipe portion having a second outer diameter, the second straight pipe portion extended from the second end along a second direction intersecting with the first direction. A cross-sectional shape of the rectangular pipe portion in a cutting plane perpendicular to a center axis of the curved pipe portion is a rectangular shape having longer sides in a third direction perpendicular to the first direction and the second direction.

According to the air supply pipe of the first aspect of the present invention, the cross-sectional shape of the curved pipe portion is a rectangular shape having longer sides in the third direction. Therefore, the air supply pipe can be compactly bent in the curved pipe portion compared to the case that the cross-sectional shape of the curved pipe portion is a circular shape. Accordingly, it is possible to compactly produce the piping space of the air supply pipe. Further, it is possible to enhance strength of the curved pipe portion compared to the case that the cross-sectional shape of the curved pipe portion is an elliptical shape or etc.

An air supply pipe according to a second aspect of the present invention relates to the first aspect of the present invention. In the air supply pipe, an outer edge of the first end viewed from the third direction is bent at a first curvature radius, while an outer edge of the second end viewed from the third direction is bent at a second curvature radius different from the first curvature radius.

According to the air supply pipe of the second aspect of the present invention, it is possible to enhance flexibility in a bent condition of the curved pipe portion. Therefore, it is possible to compactly produce the piping space of the air supply pipe, and simultaneously, effectively avoid interference with the peripheral members.

An air supply pipe according to a third aspect of the present invention relates to the second aspect of the present invention. In the air supply pipe, an outer edge of the rectangular pipe portion between the first end and the second end viewed from the third direction, is linearly extended.

According to the air supply pipe of the third aspect of the present invention, it is possible to inhibit the curved pipe portion from protruding towards peripheral members thereof, compared to the case that the outer edge of the rectangular pipe portion is bent. Therefore, the air supply pipe can be further compactly bent.

An air supply pipe according to a fourth aspect of the present invention relates to the second aspect or the fourth aspect of the present invention. In the air supply pipe, an inner edge of the curved pipe portion viewed from the third direction is bent at a third curvature radius less than the first curvature radius and the second curvature radius.

An air supply pipe according to a fifth aspect of the present invention relates to the fourth aspect of the present invention. In the air supply pipe, the third curvature radius is greater than or equal to 40% of the second outer diameter.

According to the air supply pipe of the fifth aspect of the present invention, it is possible to inhibit an air flow direction from being steeply bent within the curved pipe portion. Therefore, it is possible to reduce variation in speed of the air flowing out of the air supply pipe.

A forced induction compressor according to a sixth aspect of the present invention includes: a compressor housing accommodating a compressor impeller; an intake pipe feeding air into the compressor; and the air supply pipe according to one of the first to fifth aspects. The second straight pipe portion is coupled to the intake pipe.

According to the present invention, it is possible to provide an air supply pipe whereby a piping space can be compactly produced and a forced induction compressor including the air supply pipe.

DESCRIPTION OF THE EMBODIMENTS

Structure of Turbocharger 10

Figure 1:
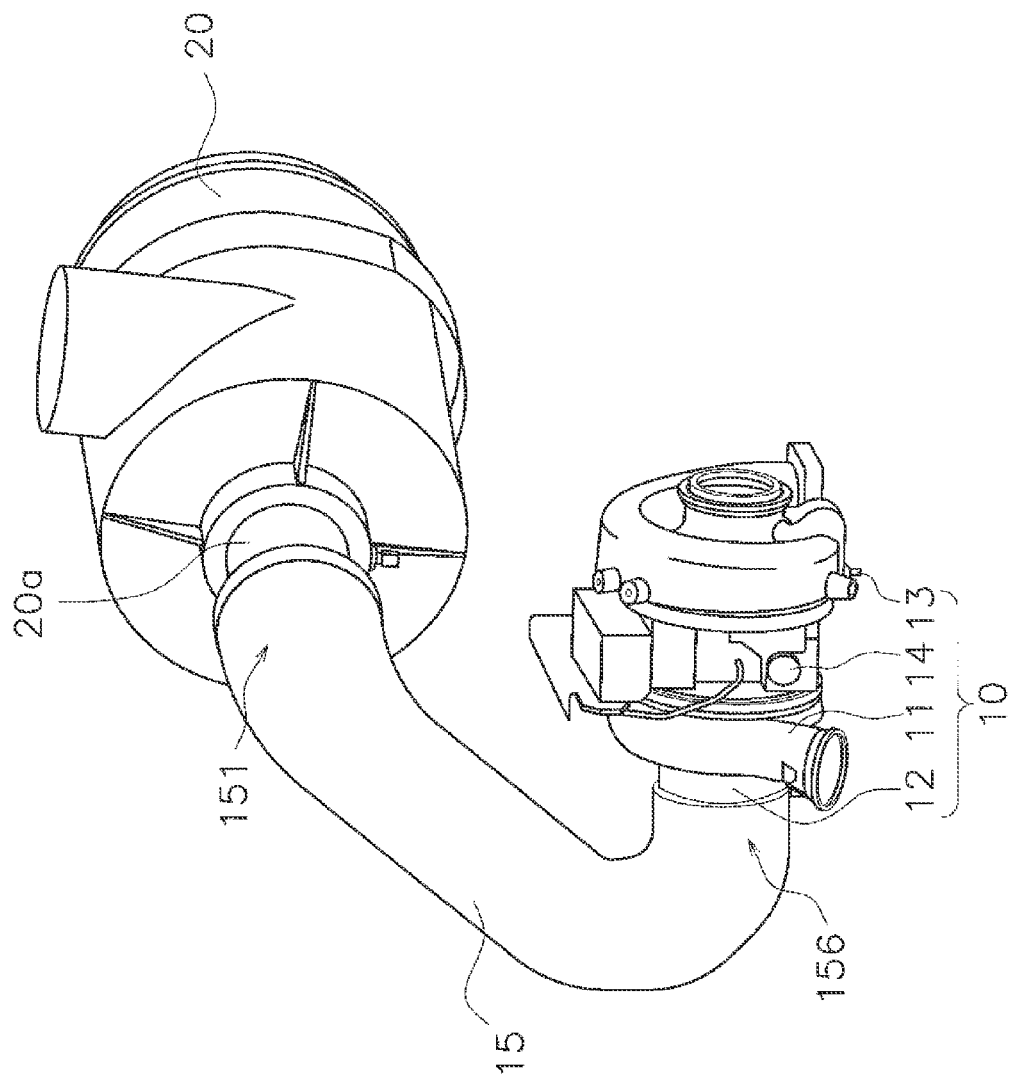
FIG. 1 is a perspective view of the structure of a turbocharger 110 according to an exemplary embodiment.

A structure of a turbocharger 10 according to an exemplary embodiment will be explained with reference to figures. FIG. 1 is a perspective view of the structure of the turbocharger 10 according to the exemplary embodiment. It should be noted that FIG. 1 illustrates a state that the turbocharger 10 is coupled to an air cleaner 20 through an air supply pipe 15.

The turbocharger 10 includes a compressor housing 11, an intake pipe 12, a turbine housing 13 and a center housing 14. The compressor housing 11 accommodates a compressor impeller (not illustrated in the figures). The intake pipe 12 is coupled to the compressor housing 11. The intake pipe 12 transfers air flowing therein from the air supply pipe 15 to the compressor impeller. The turbine housing 13 accommodates a turbine wheel (not illustrated in the figures). The center housing 14 is disposed between the compressor housing 11 and the turbine housing 13 and accommodates a shaft coupling the compressor impeller and the turbine wheel.

The air supply pipe 15 is a rubber pipe coupled to the intake pipe 12 of the turbocharger 10 and an outlet pipe 20a of the air cleaner 20. Specifically, the air supply pipe 15 has an outlet pipe connecting portion 151 coupled to the outlet pipe 20a and a second straight pipe portion 154 coupled to the intake pipe 12. The air supply pipe 15 is bent in positions respectively closer to the intake pipe 12 and the outlet pipe 20a in order to avoid interference with peripheral members thereof (not illustrated in the figures). The structure of the air supply pipe 15 will be described below.

Structure of Air Supply Pipe 15

Figure 2:
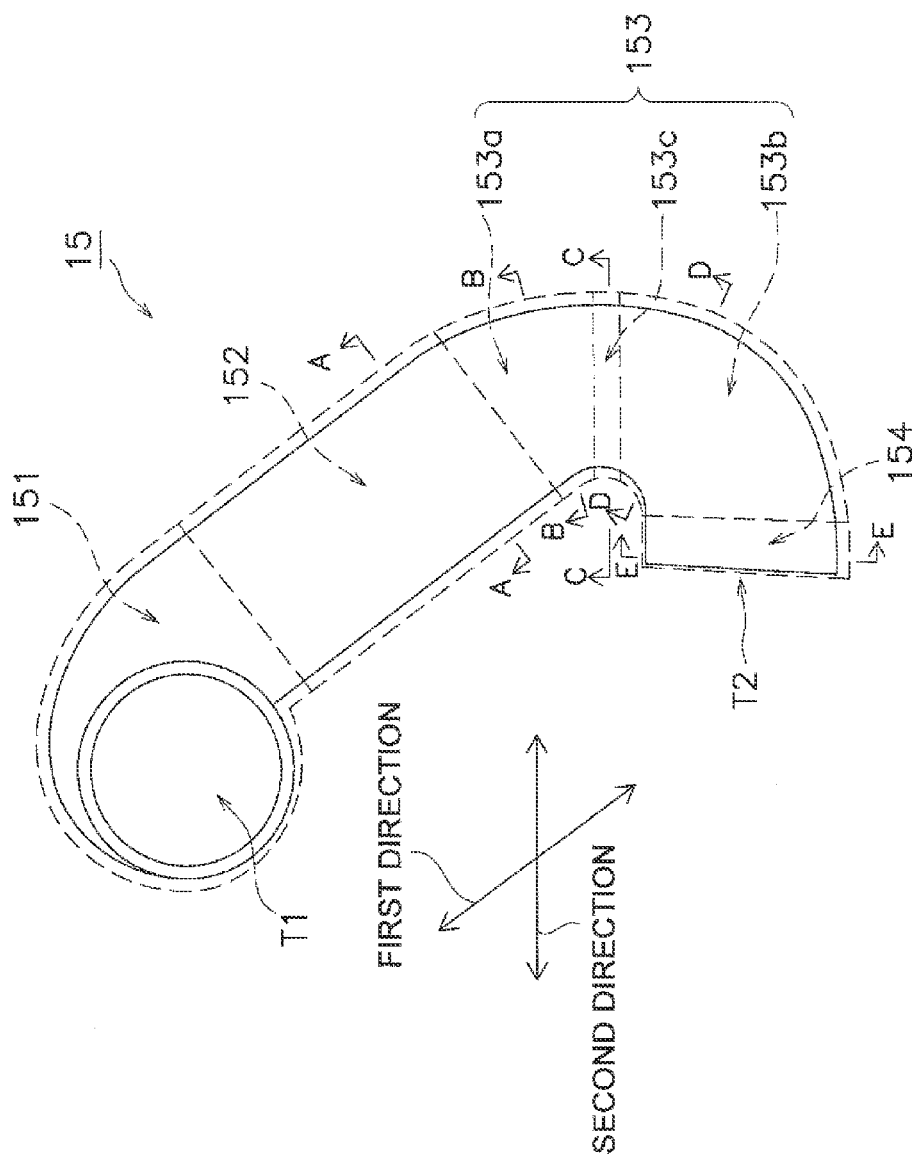
FIG. 2 is a plan view of the structure of an air supply pipe 15 according to the exemplary embodiment.

The structure of the air supply pipe 15 according to the exemplary embodiment will be explained with reference to the figures. FIG. 2 is a plan view of the structure of the air supply pipe 15 according to the exemplary embodiment. FIGS. 3A to 3E are cross-sectional views of the air supply pipe 15 according to the exemplary embodiment in a cutting plane perpendicular to a center axis C of the air supply pipe 15. It should be noted that FIG. 2 is a plan view of the air supply pipe 15 viewed from a third direction perpendicular to first and second directions. The first direction refers to a direction arranged in parallel to the center line of a first straight pipe portion 152. The second direction refers to a direction arranged in parallel to the center fine of the second straight pipe portion 154. The third direction refers to a direction arranged perpendicular to the plane of FIG. 2. Further, it should be noted in the following explanation that an outer periphery S refers to an outer periphery arranged along a circumferential direction about the axis of the air supply pipe 15.

The air supply pipe 15 is formed by the outlet pipe connecting portion 151, the first straight pipe portion 152, a curved pipe portion 153 and the second straight pipe portion 154.

As described above, the outlet pipe connecting portion 151 is coupled to the outlet pipe 20a of the air cleaner 20. The outlet pipe connecting portion 151 has an inlet port T1 for receiving air flowing therein from the outlet pipe 20a.

Figure 3A:
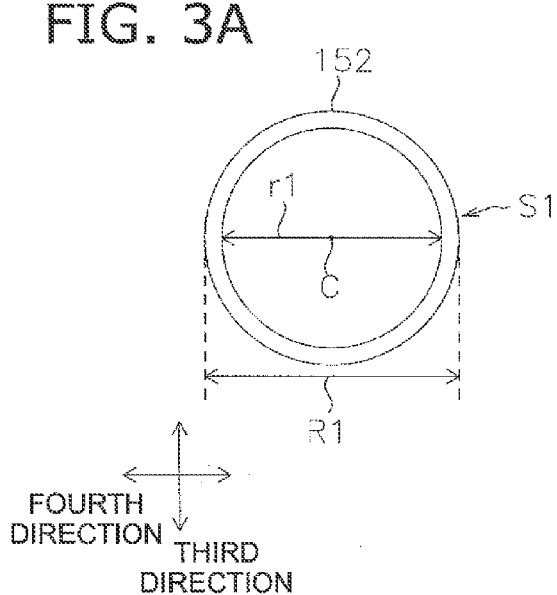
FIG. 3A is a radial cross-sectional view of the air supply pipe 15 according to the exemplary embodiment.

The first straight pipe portion 152 is communicated with the outlet pipe connecting portion 151 and the curved pipe portion 153. The first straight pipe portion 152 is a straight pipe linearly extended along the first direction. The first straight pipe portion 152 is uniformly formed in a cylindrical shape. Specifically, the first straight pipe portion 152 has a uniform first outer diameter R1 and a uniform first inner diameter r1 as illustrated in FIG. 3A. In other words, an outer periphery S1 of the first straight pipe portion 152 is uniformly bent. FIG. 3A is a radial cross-sectional view of the first straight pipe portion 152, i.e., a cross-sectional view of FIG. 2 sectioned along a line A-A.

The curved pipe portion 153 is communicated with the first straight pipe portion 152 and the second straight pipe portion 154. The curved pipe portion 153 is a tubular curved pipe that is bent towards the second straight pipe portion 154 from the first straight pipe portion 152. The curved pipe portion 153 has a first end 153a, a second end 153b and a rectangular pipe portion 153c. The first end 153a is communicated with the first straight pipe portion 152 and the rectangular pipe portion 153c. The second end 153b is communicated with the second straight pipe portion 154 and the rectangular pipe portion 153c. The rectangular pipe portion 1153c is communicated with the first end 153a and the second end 153b.

The curved pipe portion 153 is herein formed in a flattened shape in the third direction without being uniformly formed in a cylindrical shape.

Figure 3B:
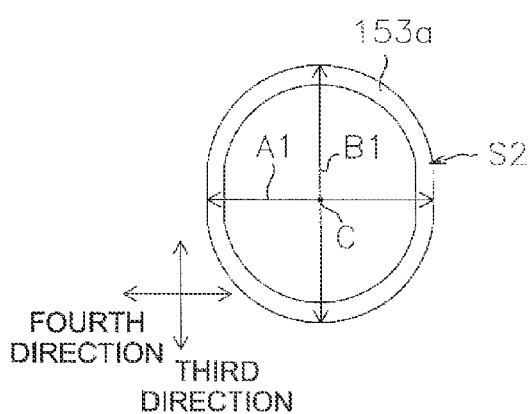
FIG. 3B is a radial cross-sectional view of the air supply pipe 15 according to the exemplary embodiment.

Specifically the cross-sectional shape of the first end 153a is a roughly elliptical shape having a major axis in the third direction, as illustrated in FIG. 3B that is a cross-sectional view of FIG. 2 sectioned along a line B-B. Specifically, a width A1 of the first end 153a in a fourth direction arranged perpendicular to the third direction on a plane including the center axis C is less than the first outer diameter R1, while a height B1 of the first end 153a in the third direction is roughly the same as the first outer diameter R1 of the first straight pipe portion 1152. Further, both of the fourth-directional ends of an outer periphery S2 of the first end 153a are linearly formed along the third direction. Thus, the cross-sectional shape of the first end 153a is flattened in the fourth direction compared to the cross-sectional shape of the first straight pipe portion 152.

Figure 3C:
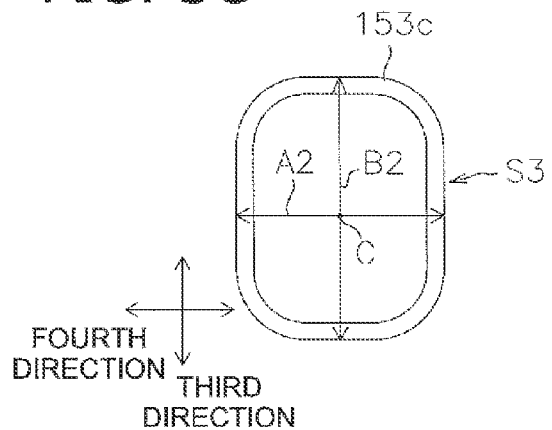
FIG. 3C is a radial cross-sectional view of the air supply pipe 15 according to the exemplary embodiment.

Further, the cross-sectional shape of the rectangular pipe portion 153c is a rectangular shape having longer sides in the third direction as illustrated in FIG. 3C that is a cross-sectional view of FIG. 2 sectioned along a line C-C. Specifically, a width A2 of the rectangular pipe portion 153c in the fourth direction is less than the width A1 of the first end 153a and a width A3 of the second end 153b, while a height B2 of the rectangular pipe portion 153c in the third direction has a dimension between the first outer diameter R1 and a second outer diameter R2 (>R1). Further, both of the fourth-directional ends of an outer periphery S3 of the rectangular pipe portion 153c are linearly formed along the third direction, while both of the third-directional ends of the outer periphery S3 of the rectangular pipe portion 153c are linearly formed along the fourth direction. Thus, the cross-sectional shape of the rectangular pipe portion 153c is flattened in the fourth direction compared to the cross-sectional shape of the first straight pipe portion 152.

Figure 3D:
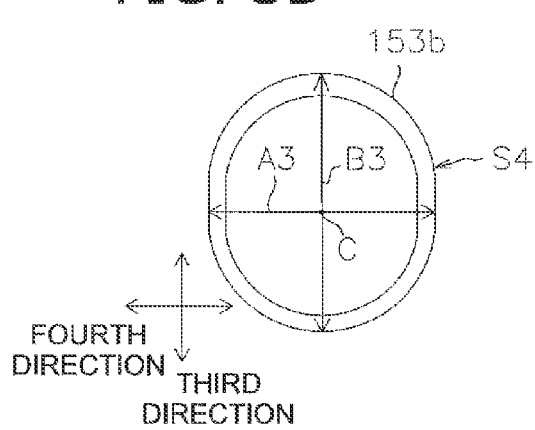
FIG. 3D is a radial cross-sectional view of the air supply pipe 15 according to the exemplary embodiment.

Further, the cross-sectional shape of the second end 153b is a roughly elliptical shape having a major axis in the third direction as illustrated in FIG. 3D that is a cross-sectional view of FIG. 2 sectioned along a line D-D. Specifically, the width A3 of the second end 153b in the fourth direction is less than the second outer diameter R2 of the second straight pipe portion 154, while a height B3 of the second end 153b in the third direction is roughly the same as the second outer diameter R2 of the second straight pipe portion 154. Further, both of the fourth-directional ends of an outer periphery S4 of the second end 153b are linearly formed along the third direction. Thus, the cross-sectional shape of the second end 153b is flattened in the fourth direction compared to the cross-sectional shape of the second straight pipe portion 154.

Thus, the curved pipe portion 153 is entirely flattened in the third direction, but is not necessarily uniformly formed in a flattened shape. The curved pipe portion 153 is gradually deformed from a cylindrical shape to a rectangular shape in the first end 153a while being gradually deformed from a rectangular shape to a cylindrical shape in the second end 153b.

Figure 3E:
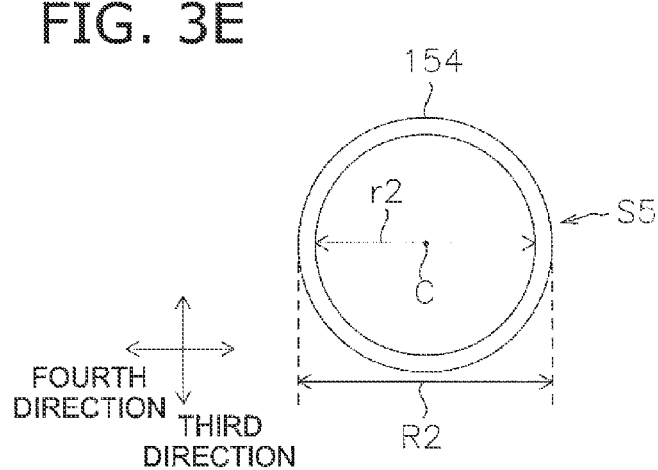
FIG. 3E is a radial cross-sectional view of the air supply pipe 15 according to the exemplary embodiment.

As described above, the second straight pipe portion 154 is coupled to the intake pipe 12. The second straight pipe portion 154 has an outlet port T2 that air flows therefrom. The second straight pipe portion 154 is a straight pipe linearly extended along the second direction. The second straight pipe portion 154 is uniformly formed in a cylindrical shape. Specifically, the second straight pipe portion 154 has the uniform second outer diameter R2 (>R1) and a uniform second inner diameter r2 (>r1) as illustrated in FIG. 3E. In other words, the outer periphery S4 of the second straight pipe portion 154 is bent more steeply than the outer periphery (including the outer peripheries S2, S3 and S4) of the curved pipe portion 153, similarly to the outer periphery S1 of the first straight pipe portion 152. FIG. 3E is a cross-sectional view of FIG. 2 sectioned along a line E-E.

Bent Condition of Curved Pipe Portion 153

Figure 4:
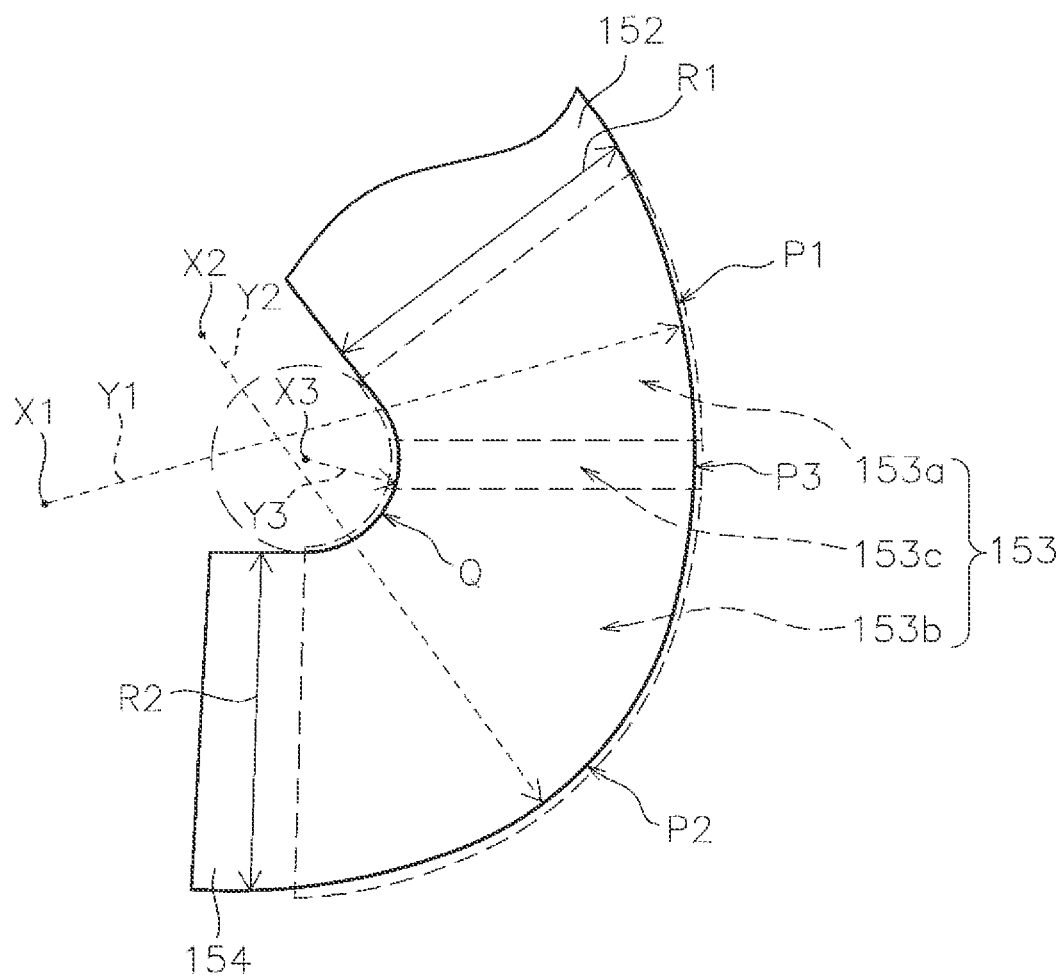
FIG. 4 is a partial enlarged view of FIG. 2.

A bent condition of the curved pipe portion 153 according to the exemplary embodiment will be explained with reference to the figures. FIG. 4 is a partial enlarged view of FIG. 2 and is a plan view of the curved pipe portion 153 viewed from the third direction. It should be noted in the following explanation that an outer edge P refers to the outer edge of the curved pipe portion 153 viewed from the third direction.

An outer edge P1 of the first end 153a is bent about a center point X1 at a first curvature radius Y1. An outer edge P2 of the second end 153b is bent about a center point X2 at a second curvature radius Y2. An outer edge P3 of the rectangular pipe portion 153c is linearly extended without being bent. In the present exemplary embodiment, the first curvature radius Y1 is a curvature radius different from the second curvature radius Y2 and is greater than the second curvature radius Y2.

Further, an inner edge Q of the curved pipe portion 153 is bent about a center point X3 at a third curvature radius Y3. In the present exemplary embodiment, the third curvature radius Y3 is less than the first curvature radius Y1 and the second curvature radius Y2. Further, the third curvature radius Y3 is greater than or equal to 40% of the second outer diameter R2 of the second straight pipe portion 154.

Method of Manufacturing Air Supply Pipe 15

First, a dividable core is set inside a tube of an assembly mold. Next, tube rubber is extruded and inserted into the assembly mold. Next, the inserted tube rubber is wrapped with reinforcement material and is vulcanized. Finally, the assembly mold is disassembled, and subsequently, the core is pulled out while being divided.

Actions and Effects (1) In the air supply pipe 15 according to the exemplary embodiment, the cross-sectional shape of the curved pipe portion 153 is a rectangular shape having longer sides in the third direction. Therefore, the air supply pipe 115 can be further compactly bent in the curved pipe portion 153 compared to the case that the cross-sectional shape of the curved pipe portion 153 is a circular shape. Therefore, the piping space of the air supply pipe 15 can be compactly produced. Further, strength of the curved pipe portion 153 can be further enhanced compared to the case that the cross-sectional shape of the curved pipe portion 153 is an elliptical shape or etc. Such effects are especially useful when negative pressure is generated in the inside of the air supply pipe 15 due to the suction force of the turbocharger 10.

(2) The first curvature radius Y1 related to the outer edge P1 of the first end 153a is different from the second curvature radius Y2 related to the outer edge P2 of the second end 153b. Therefore, it is possible to enhance flexibility in a bending condition of the curved pipe portion 153. Accordingly, the piping space of the air supply pipe 15 can be compactly produced, and simultaneously, interference with the peripheral members can be effectively avoided.

(3) The outer edge P3 of the rectangular pipe portion 153c is linearly extended. It is thereby possible to inhibit the curved pipe portion 153 from protruding towards the peripheral members, compared to the case that the outer edge P3 of the rectangular pipe portion 153c is bent. Accordingly, the air supply pipe 15 can be further compactly bent.

(4) The inner edge Q of the curved pipe portion 153 is bent at the third curvature radius Y3 that is less than the first curvature radius Y1 and the second curvature radius Y2. The third curvature radius Y3 is greater than or equal to 40% of the second outer diameter R2 of the second straight pipe portion 154.

Thus, it is possible to inhibit an air flow direction from being steeply bent within the curved pipe portion 153 by setting the third curvature radius Y3 to be greater than or equal to 40% of the second outer diameter R2. It is thereby possible to reduce variation in speed of the air flowing out of the outlet port T2 of the air supply pipe 15. Therefore, occurrence of hunting can be inhibited in the compressor impeller within the compressor housing 11. In other words, the compressor impeller can be inhibited from being damaged or broken.

Other Exemplary Embodiments

An exemplary embodiment of the present invention has been explained above. However, the present invention is not limited to the aforementioned exemplary embodiment, and a variety of changes can be herein made without departing from the scope of the present invention.

(A) In the aforementioned exemplary embodiment, the air supply pipe 15 is designed as a rubber pipe. However, the present invention is not limited to this. For example, the air supply pipe 15 may be a cast product formed using a mold.

(B) In the aforementioned exemplary embodiment, the air supply pipe 15 is designed to be provided for the turbocharger 10. However, the present invention is not limited to this. For example, the air supply pipe 15 may be provided for a forced induction compressor of a supercharger type, a diesel particulate filter processing device, a selective catalytic reduction processing device or etc.

(C) In the aforementioned exemplary embodiment, the air supply pipe 15 is designed to be disposed on an intake pipe side. However, the present invention is not limited to this. The air supply pipe 15 may be disposed on an exhaust pipe side.

(D) In the aforementioned exemplary embodiment, the first outer diameter R1 of the first straight pipe portion 152 is set to be greater than the second outer diameter R2 of the second straight pipe portion 154, while the first inner diameter r1 of the first straight pipe portion 152 is set to be greater than the second inner diameter r2 of the second straight pipe portion 154. However, the present invention is not limited to this. The first outer diameter r1 may be less than or equal to the second outer diameter R2. Similarly, the first inner diameter r1 may be less than or equal to the second inner diameter r2.

Variation in speed of the air hitting the compressor impeller was simulated where an air supply pipe according to a practical example and that according to a conventional example were respectively applied to a turbocharger. It should be noted that a cylindrical pipe having a uniform outer diameter was used as the air supply pipe according to the conventional example.

Figure 5A:
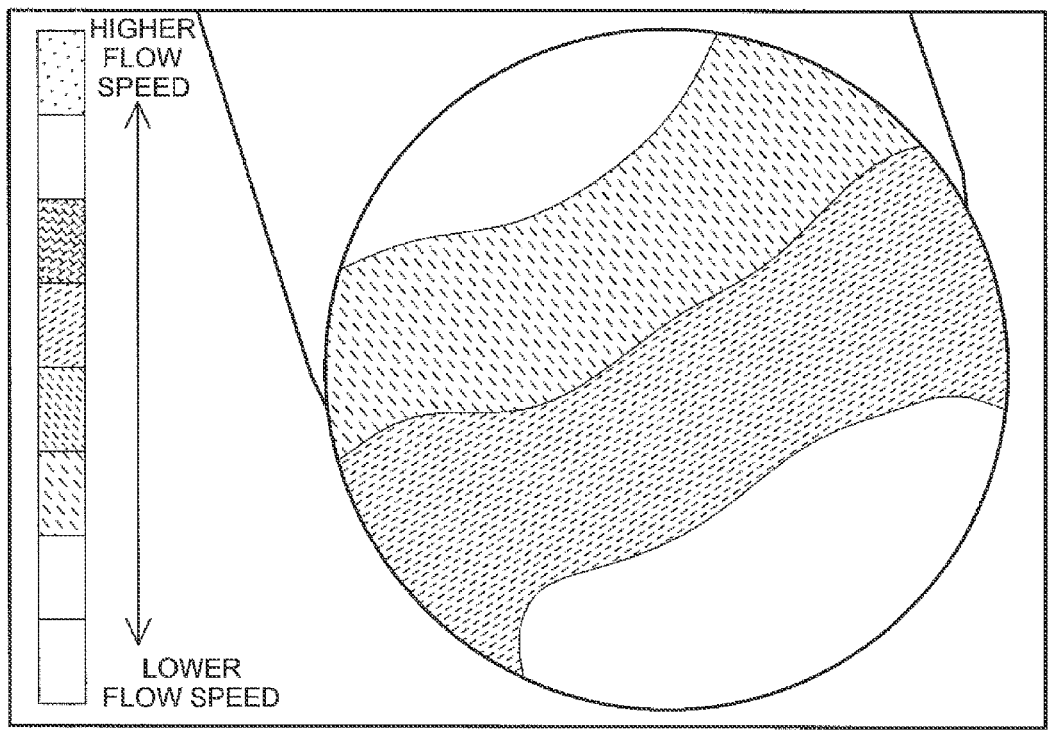
FIG. 5A is a diagram representing a simulation result according to a practical example.
Figure 5B:
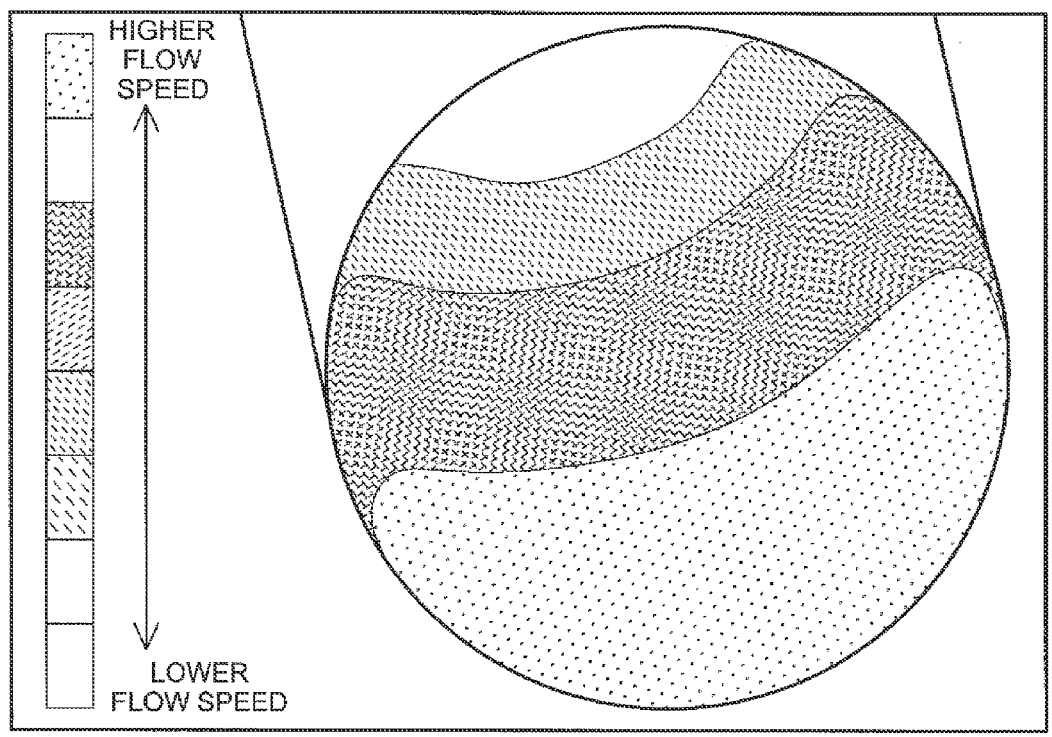
FIG. 5B is a diagram representing a simulation result according to a comparative example.

FIG. 5A is a simulation result where the air supply pipe according to the practical example was applied. FIG. 5B is a simulation result where the air supply pipe according to the conventional example was applied. As represented in FIGS. 5A and 5B, it was found that the air supply pipe according to the practical example could reduce variation in the air speed (i.e., difference between the maximum flow speed and the minimum flow speed) to roughly ½ compared to the air supply pipe according to the conventional example. Therefore, it was confirmed that stable air supply can be achieved by the air supply pipe 15 of the aforementioned exemplary embodiment.

According to the illustrated embodiments, it is possible to provide an air supply pipe whereby a piping space can be compactly produced. Therefore, the present invention is useful in the field of piping.

The invention claimed is:

1. An air supply pipe comprising:
a curved pipe portion formed in a tubular shape, the curved pipe portion including a first end, a second end and a rectangular pipe portion communicated with the first end and the second end;
a first straight pipe portion formed in a cylindrical shape, the first straight pipe portion having a first outer diameter, the first straight pipe portion extending from the first end along a first direction; and
a second straight pipe portion formed in a cylindrical shape, the second straight pipe portion having a second outer diameter, the second straight pipe portion extending from the second end along a second direction intersecting with the first direction, wherein
a cross-sectional shape of the rectangular pipe portion in a cutting plane perpendicular to a center axis of the curved pipe portion is a rectangular shape having longer sides in a third direction perpendicular to the first direction and the second direction,
an outer edge of the first end viewed from the third direction is bent at a first curvature radius, and
an outer edge of the second end viewed from the third direction is bent at a second curvature radius different from the first curvature radius.

2. The air supply pipe recited in claim 1, wherein
an outer edge of the rectangular pipe portion viewed from the third direction is linearly extended.

3. The air supply pipe recited in claim 1, wherein
an inner edge of the curved pipe portion viewed from the third direction is bent at a third curvature radius less than the first curvature radius and the second curvature radius.

4. The air supply pipe recited in claim 3, wherein
the third curvature radius is greater than or equal to 40% of the second outer diameter.

5. A forced induction compressor comprising:
a compressor housing configured to accommodate a compressor impeller;
an intake pipe configured to feed air into the compressor; and
the air supply pipe recited in claim 1, wherein
the second straight pipe portion is coupled to the intake pipe.

* * * * *

UNITED STATES PATENT AND TRADEMARK OFFICE
CERTIFICATE OF CORRECTION

PATENT NO.        : 8,555,637 B2                                        Page 1 of 1
APPLICATION NO.   : 13/809152
DATED             : October 15, 2013
INVENTOR(S)       : Yoshihide Nakae et al.

It is certified that error appears in the above-identified patent and that said Letters Patent is hereby corrected as shown below:

On the Title Page, Item (54), change "WORK VEHICLE" to --AIR SUPPLY PIPE AND FORCED INDUCTION COMPRESSOR--

Signed and Sealed this
Seventeenth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,555,637 B2  Page 1 of 1
APPLICATION NO. : 13/809152
DATED : October 15, 2013
INVENTOR(S) : Yoshihide Nakae et al.

It is certified that error appears in the above-identified patent and that said Letters Patent is hereby corrected as shown below:

On the Title Page, Item (54), and in the Specification, Col. 1, line 1, change "WORK VEHICLE" to
--AIR SUPPLY PIPE AND FORCED INDUCTION COMPRESSOR--

This certificate supersedes the Certificate of Correction issued June 17, 2014.

Signed and Sealed this
Fifteenth Day of July, 2014

Michelle K. Lee
*Deputy Director of the United States Patent and Trademark Office*